(12) United States Patent
Lennon et al.

(10) Patent No.: US 6,718,063 B1
(45) Date of Patent: Apr. 6, 2004

(54) METHOD AND APPARATUS FOR COMPUTING THE SIMILARITY BETWEEN IMAGES

(75) Inventors: Alison Joan Lennon, Balmain (AU); Jing Wu, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/458,063

(22) Filed: Dec. 10, 1999

(30) Foreign Application Priority Data

Dec. 11, 1998 (AU) .............................................. PP7643

(51) Int. Cl.⁷ ................................................. G06K 9/62
(52) U.S. Cl. ........................ 382/224; 382/164; 382/165; 382/180; 382/219; 382/224; 382/305; 707/6
(58) Field of Search .......................... 345/700; 382/173, 382/180, 190, 209, 219–220, 224, 228, 305; 707/3, 5–6

(56) References Cited

U.S. PATENT DOCUMENTS

| | | | | |
|---|---|---|---|---|
| 5,544,256 A | * | 8/1996 | Brecher et al. | 382/149 |
| 5,745,598 A | | 4/1998 | Shaw et al. | 382/209 |
| 5,884,294 A | * | 3/1999 | Kadar et al. | 706/10 |
| 5,893,095 A | | 4/1999 | Jain et al. | 706/6 |
| 5,929,940 A | * | 7/1999 | Jeannin | 348/699 |
| 5,963,670 A | | 10/1999 | Lipson et al. | 382/224 |
| 5,995,668 A | * | 11/1999 | Corset et al. | 382/233 |
| 6,108,674 A | * | 8/2000 | Murakami et al. | 715/515 |
| 6,134,541 A | * | 10/2000 | Castelli et al. | 707/2 |
| 6,175,663 B1 | * | 1/2001 | Huang | 382/284 |
| 6,192,150 B1 | * | 2/2001 | Leow et al. | 382/190 |
| 6,345,274 B1 | * | 2/2002 | Zhu et al. | 707/5 |
| 6,463,426 B1 | * | 10/2002 | Lipson et al. | 707/3 |
| 6,516,090 B1 | * | 2/2003 | Lennon et al. | 382/173 |
| 6,584,221 B1 | * | 6/2003 | Moghaddam et al. | 382/165 |

OTHER PUBLICATIONS

IEEE Transactions In Pattern Analysis And Machine Intelligence, by Panjwani and Healey, vol. 17, pp. 939–954, 1995.

Stochastic Relaxation, Gibbs Distributions, and The Bayesian Restoration Of Images, by S. Geman and D. Geman, IEEE Transactions On Pattern Analysis And Machine Intelligence, vol. PAMI–6, No. 6, Nov. 1994, pp. 721–741.

J.R. Statistical Society, by J. Besag, vol. 48, pp. 259–302, 1986.

\* cited by examiner

Primary Examiner—Bhavesh M. Mehta
Assistant Examiner—Gregory Desire
(74) Attorney, Agent, or Firm—Fitzpatrick, Cella, Harper & Scinto

(57) ABSTRACT

The method first segments both images into homogeneous regions (205A) and assigns (207A) semantic labels (such as "sky", "cloud", "water", "foliage" etc) to the homogeneous regions to describe the content of the regions using a probabilistic method. This process also results in each assigned label for a region having an associated probability value expressing the confidence level of the label being correctly assigned The method then computes (108) a distance metric which averages over all corresponding pixels in the two images a value which is the product of a predetermined semantic difference between the assigned labels at the corresponding pixels and a weighting function which is derived from the associated probability values of the labels for each of the corresponding pixels. The semantic difference reflects similarities between the labels. For example, the semantic difference of the label pair "sky" and "foliage" is higher than the semantic difference between the more similar "sky" and "cloud" label pair. The method then compares (110) the distance metric value with a predetermined threshold value in order to determine the similarity of the images.

37 Claims, 8 Drawing Sheets

| Node or Region | Associated Cliques |
|---|---|
| R1 | {R1}, {R1, R2}, {R1, R3} |
| R2 | {R2}, {R2, R4}, {R2, R8}, {R2, R4, R8} |
| R3 | {R3}, {R3, R4}, {R3, R7}, {R3, R4, R7} |
| R4 | {R4}, {R4, R5}, {R4, R6}, {R4, R7}, {R4, R8} |
| R5 | {R5} |
| R6 | {R6} |
| R7 | {R7} |
| R8 | {R8}, {R8, R9} |
| R9 | {R9} |

FIG. 6

METHOD AND APPARATUS FOR COMPUTING THE SIMILARITY BETWEEN IMAGES

FIELD OF INVENTION

The present invention relates to a method and apparatus for computing the similarity between two images. The invention also relates to a computer readable medium comprising a computer program for computing the similarity between two images.

BACKGROUND

As network connectivity has continued its explosive growth and digital storage and capture devices have become smaller, faster, and less expensive, the amount of on-line digital content has increased rapidly. It is now very difficult to provide access to all this digital information using traditional database retrieval technology based on manually associating textual descriptions with digital image or video contents. For this reason, there has been a considerable motivation to be able to extract information about the digital content and make this information available to people wanting to retrieve particular images or video according to their content. This field of interest is generally referred to as content-based retrieval.

Automated content-based retrieval can be achieved by either the automated analysis of the digital content resulting in keywords, or textual annotations, which may be used as the basis for search and retrieval, or by providing some level of search and retrieval based on similarity to a particular example of the digital content. This invention is related to the latter method of automated content-based retrieval of digital images and video.

Content-based retrieval of images (and hence frames of video) by similarity is typically based on the automatic extraction from the digital signal of low-level color, texture and shape features and computing the similarity between two sets of thus computed features using a predetermined similarity metric.

For example, the color of a digital image can be represented by a low-level feature consisting of a color histogram. This histogram can be based on the entire image or based on selected areas of the image in either the spatial or frequency domains. The similarity between the color histograms extracted from two images can be computed using an $L_p$ distance metric, such as the Euclidean distance. This similarity metric can be based on the individual components of the histograms or on other measures derived from the histogram (e.g., the mean, variance and skewness of the histograms).

Similarly, texture and shape features can also be automatically extracted from digital images. Typical texture features comprise second-order statistics (i.e., variances), wavelet-based methods and the Tamura algorithm. Methods for representing the shape of objects in an image comprise moment-based features, spline functions that represent boundaries, and Fourier descriptor methods. For each low-level feature there are generally many ways of computing the similarity between the features automatically extracted from two images.

Generally, in an application providing content-based retrieval of images by similarity, the user is presented with several example images. He/she then selects the example that is most like the image that is required. The application then searches a database of images, which typically also contains sets of automatically calculated features for each image, and retrieves a set of images that is most similar to the image selected by the user. The user night also select the similarity measure (e.g., similarity based on color) that they wish the application to use when selecting similar images. This method can also be extended to retrieve frames from digital video content.

The success of existing content-based retrieval systems has been limited by the fact that many users wish to be able to retrieve digital imagery based on higher-level knowledge of the content. For example, rather than retrieving a set of images that have a similar overall color they might wish to retrieve images which have a mountainous terrain with a body of water and were taken on a sunny day. Another problem of retrieval based on similarity between low-level features is that of the user understanding what the automatically extracted features represent in terms of image appearance. Many existing texture features depend highly on the resolution of the image, whereas humans tend to have an ability to abstract the resolution dependence of texture. For example, regions of grass captured at different resolutions may look very similar to a human user, however the different resolutions result in very different texture features for the regions. Retrieval by shape can also be problematic since low-level shape analysis generally has no knowledge of what objects are of particular interest to the user.

In summary, although existing content-based retrieval by similarity applications have provided access to otherwise inaccessible libraries of digital imagery, there exists a need for methods of retrieval by similarity to take into account higher-level semantic information that exists in the digital content.

SUMMARY OF INVENTION

It is an object of the present invention to ameliorate one or more disadvantages of the prior art.

According to a first aspect of the invention, there is provided a method of computing the similarity between two images, wherein said images each comprise a plurality of pixels and said method comprises the steps of: segmenting each of the images into homogeneous regions; assigning to at least one of the generated regions a semantic label which describes the content of the region; and computing a distance metric which averages over all corresponding pixels in the two images a value which is the product of a predetermined semantic difference between the assigned labels at the corresponding pixels and a weighting function which depends on the probability of the labels being correctly assigned for each of the corresponding pixels, wherein said distance metric is representative of the similarity of the two images.

According to a second aspect of the invention, there is provided a method of computing the similarity between two images, wherein said images each comprise a plurality of pixels and said method comprises the steps of: segmenting each of the images into homogeneous regions; assigning the semantic labels to the homogeneous regions to describe the content of the regions using a probabilistic method which results in each assigned label for a region having an associated probability or likelihood of the label being correctly assigned; computing a distance metric which averages over all corresponding pixels in the two images a value which is the product of a predetermined semantic difference between the assigned labels at the corresponding pixels and a weighting function which is derived from the associated probability of the labels for each of the corresponding pixels; and comparing the distance metric with a predetermined threshold in order to determine the similarity of the images.

According to a third aspect of the invention, there is provided apparatus for computing the similarity between two images, wherein said images each comprise a plurality of pixels and said apparatus comprises: means for segmenting each of the images into homogeneous regions; means for assigning to at least one of the generated regions a semantic label which describes the content of the region; and means for computing a distance metric which averages over all corresponding pixels in the two images a value which is the product of a predetermined semantic difference between the assigned labels at the corresponding pixels and a weighting function which depends on the probability of the labels being correctly assigned for each of the corresponding pixels, wherein said distance metric is representative of the similarity of the two images.

According to a fourth aspect of the invention, there is provided apparatus for computing the similarity between two images, wherein said images each comprise a plurality of pixels and said apparatus comprises: means for segmenting each of the images into homogeneous regions; means for assigning the semantic labels to the homogeneous regions to describe the content of the regions using a probabilistic method which results in each assigned label for a region having an associated probability or likelihood of the label being correctly assigned; means for computing a distance metric which averages over all corresponding pixels in the two images a value which is the product of a predetermined semantic difference between the assigned labels at the corresponding pixels and a weighting function which is derived from the associated probability of the labels for each of the corresponding pixels; and means for comparing the distance metric with a predetermined threshold in order to determine the similarity of the images.

According to a second aspect of the invention, there is provided a computer readable medium comprising a computer program for computing the similarity between two images, wherein said images each comprise a plurality of pixels, said computer program comprises: code for segmenting each of the images into homogeneous regions; code for assigning to at least one of the generated regions a semantic label which describes the content of the region; and code for computing a distance metric which averages over all corresponding pixels in the two images a value which is the product of a predetermined semantic difference between the assigned labels at the corresponding pixels and a weighting function which depends on the probability of the labels being correctly assigned for each of the corresponding pixels, wherein said distance metric is representative of the similarity of the two images.

According to a second aspect of the invention, there is provided a computer readable medium comprising a computer program for computing the similarity between two images, wherein said images each comprise a plurality of pixels, said computer program comprises: code for segmenting each of the images into homogeneous regions; code for assigning the semantic labels to the homogeneous regions to describe the content of the regions using a probabilistic method which results in each assigned label for a region having an associated probability or likelihood of the label being correctly assigned; code for computing a distance metric which averages over all corresponding pixels in the two images a value which is the product of a predetermined semantic difference between the assigned labels at the corresponding pixels and a weighting function which is derived from the associated probability of the labels for each of the corresponding pixels; and code for comparing the distance metric with a predetermined threshold in order to determine the similarity of the images.

BRIEF DESCRIPTION OF THE DRAWINGS

Embodiments of the invention are described with reference to the drawings, in which:

FIG. 6 represents a set of associated cliques for the region adjacency graph of FIGS. 3B and 4B.

DETAILED DESCRIPTION

Figure 1:
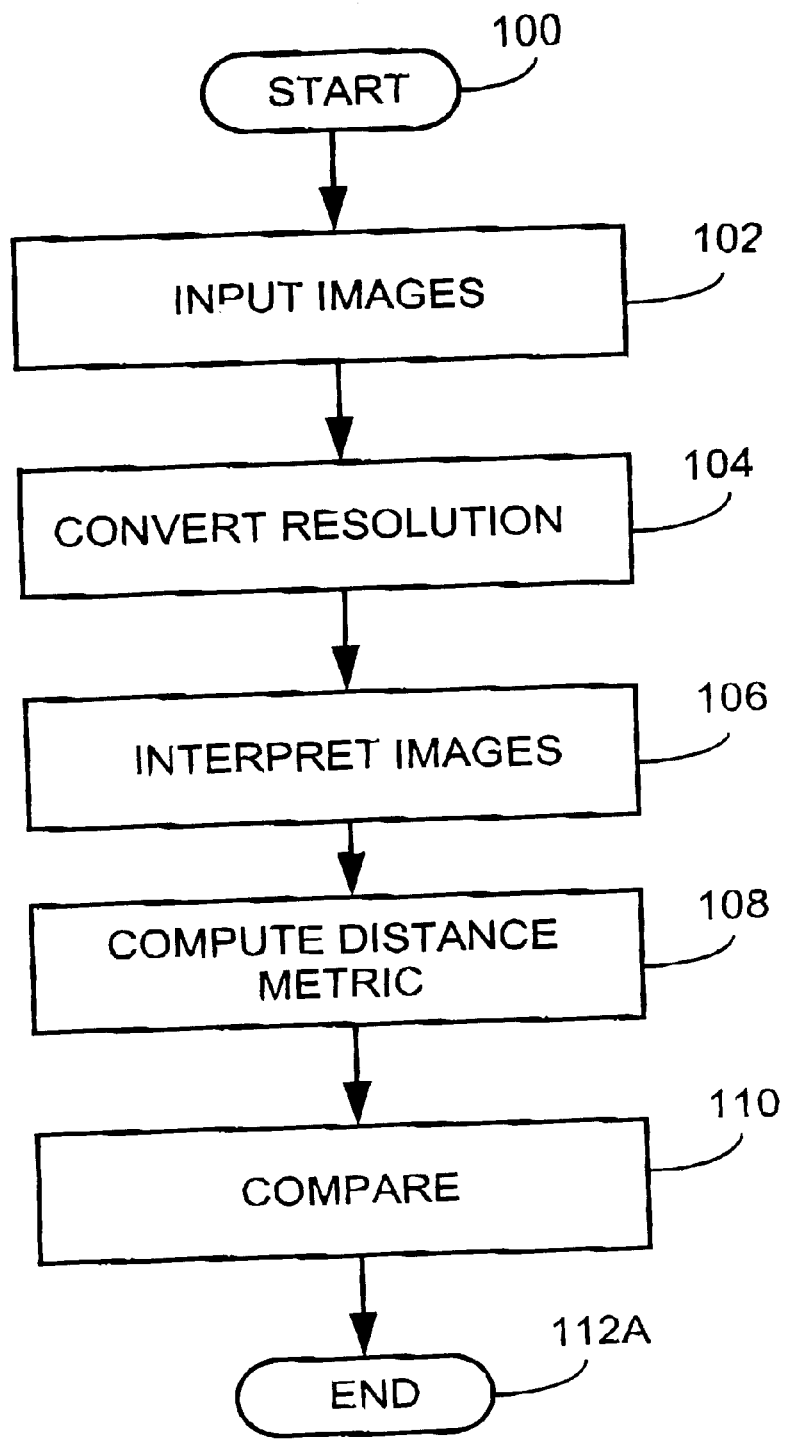
FIG. 1 is a flow diagram of a method of computing the similarity between two digital images in accordance with a first embodiment.

Where reference is made in any one or more of the accompanying drawings to steps and/or features, which have the same reference numerals, those steps and/or features have for the purposes of this description the same function(s) and/or operation(s), unless the contrary intention appears.

The principles of the embodiments described herein have general applicability to determining the similarity between two digital images.

FIG. 1 is a flow diagram of a method of computing the similarity between two digital images in accordance with a first embodiment. The method commences at step 100 and any necessary parameters are initialized. In the next step 102, the two digital images to be compared are inputted. The sampled digital images typically consists of pixel intensities for a multiplicity of color channels (e.g., red, green and blue). In some cases other contextual information (e.g., camera parameters, range information, and an associated audio signal) might also be associated with the sampled digital images. After step 102, the processing continues at step 104, where a check is made whether the two images are the same dimensions in pixels. If the two images do not have the same dimensions in pixels, then typically the image having the larger dimensions is scaled to the same dimensions as the image having the lower dimensions. This scaling can be achieved by those skilled in the art by filtering and downsampling. Typically the images to be compared have the same aspect ratio, however this is not essential. In the event that the two images have different aspect ratios, the computer distance metric is unlikely to represent the similarity of the two images as accurately. Once the images are converted to the same pixel dimensions, the processing then proceeds to an image interpretation step 106.

Figure 2A:
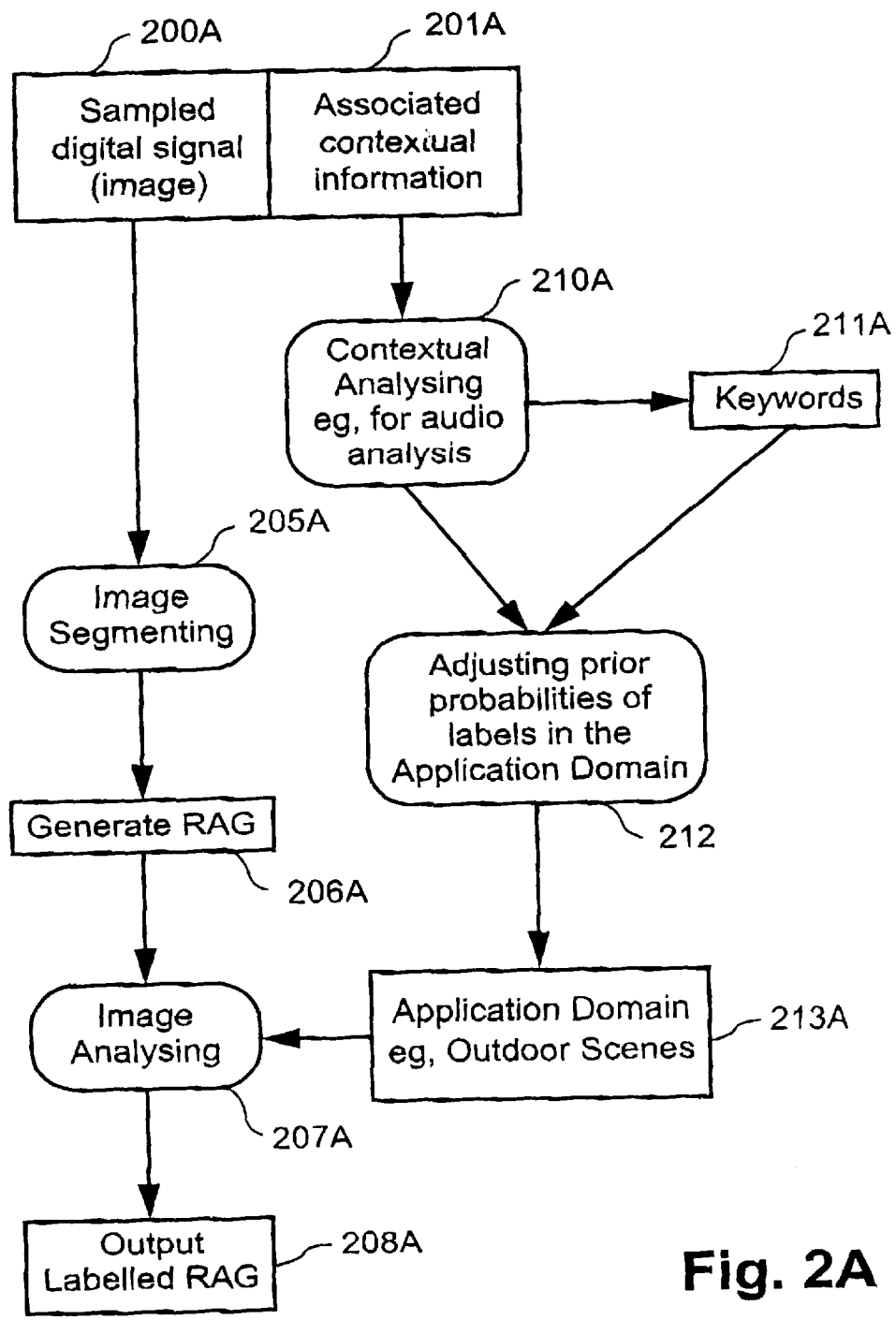
FIG. 2A is a block diagram illustrating the image interpreting step 106 according to the first embodiment.

Turning now to FIG. 2A, there is shown a block diagram of the image interpreting step 106 in accordance with the first embodiment. The sampled digital images, 200A and contextual information 201A (e.g., camera parameters, range information, and an associated audio signal) are each passed to the image interpretation process 106. The latter information can provide additional clues for the interpretation of the digital image. However, the availability and subsequent processing of contextual information is not essential for the image interpretation process 106.

The sampled digital image signal 200A is first segmented into homogeneous regions by an image segmenting step 205A, using a region-based segmentation method (e.g., the method described by Panjwani and Healey, IEEE Transactions in Pattern Analysis and Machine Intelligence, 17, 939–954, 1995). It is preferable for this segmentation to be based on texture and color. The type of segmenting process is not essential to the method and any known segmenting process may be used. After the segmentation step 205A, a region adjacency graph is generated in step 206A.

Figure 3A:
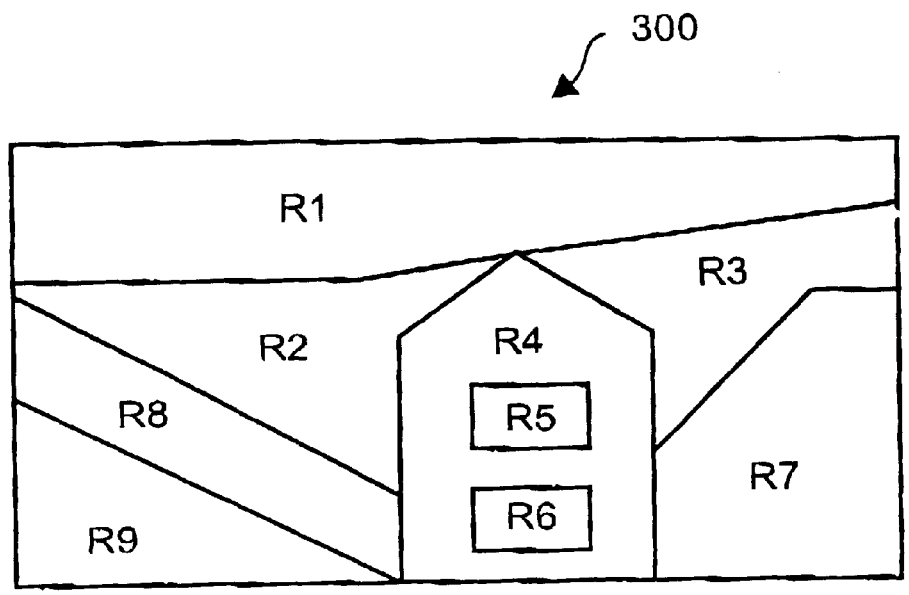
FIGS. 3A and 3B illustrate a representative segmented image and a corresponding two-dimensional region adjacency graph, respectively.
Figure 3B:
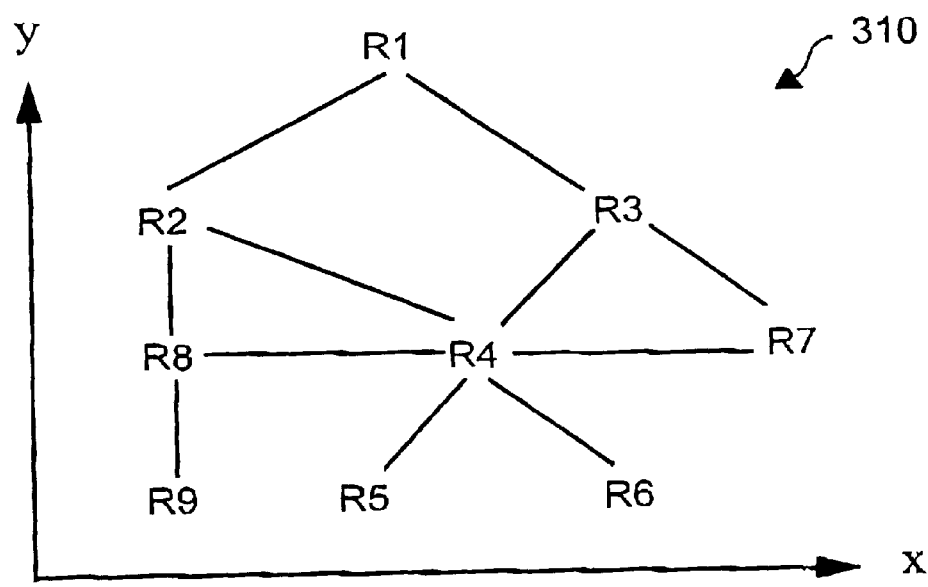

The region adjacency graph (RAG) generated in step 206A, is defined to be a graph G which contains a set R of disjoint regions and a set E of edges connecting the regions; G={R, E}. An example of a representation of a segmented image 300 and a corresponding RAG 310 is shown in FIGS. 3A and 3B.

Figure 4A:
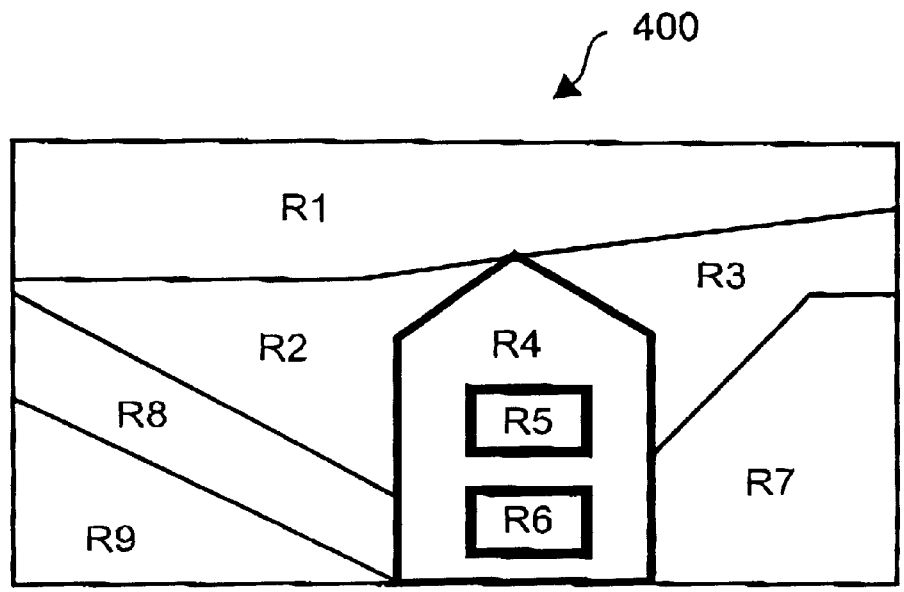
FIGS. 4A and 4B illustrate a representative segmented image and a corresponding three-dimensional region adjacency graph, respectively.
Figure 4B:
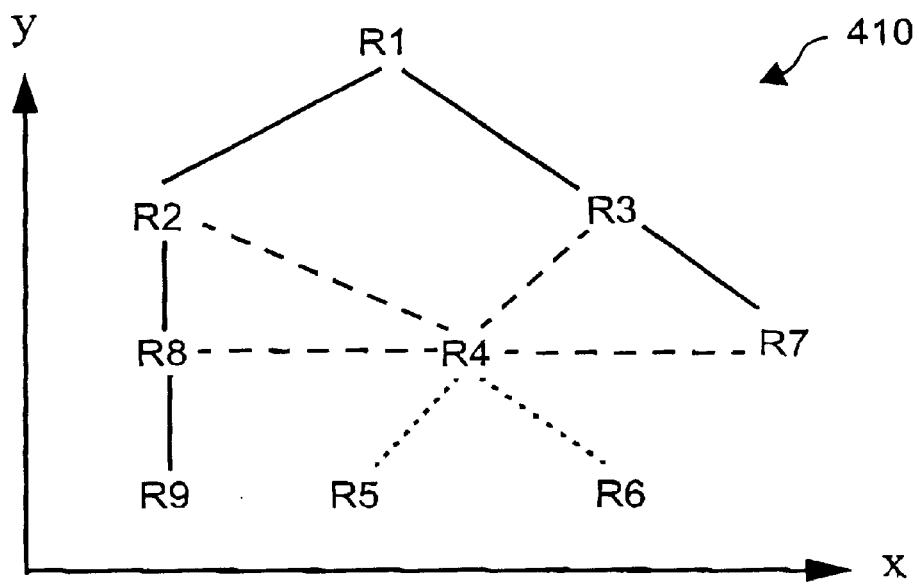

The RAG can be three-dimensional if range information is available with the digital image signal. An example of a three-dimensional RAG is shown in FIG. 4B. The spatially segmented fame 400 contains nine regions named R1 to R9. The region R1 contains sky. The regions R2, R3, and R9 contain land and the region R8 is a road. The region R4 is a house-like structure, and the regions R5 and R6 are projecting structures in the house. To indicate depth in FIG. 4A, border of regions are indicated with several thicknesses. In particular, the thickness of the respective borders indicate the actual depth in the Z-axis. The RAG 410 indicates connected edges of regions R1 to R9 in the segmented frame 300. The regions R1, R2, R3, R7, R8 and R9 are all located at the same approximate depth (as indicated by solid edge lines) in the RAG 310 but at different X-Y positions. The region R1 is sequentially connected to regions R2, R8, R9 on the one hand and to regions R3 and R7 on the other hand. In turn, the region R4 has an edge with region R2, R3, R7 and R8, but has a different depth as indicated by dashed or broken edge lines. Finally, the regions R5 and R6 share an edge with the region R4 but at a different, parallel depth indicated by dotted edge lines. Thus, the dashed and dotted lines cross different Z-planes.

Returning to FIG. 2A, after step 206A, the method proceeds to an image analyzing step 207A. The image analyzing step 207A uses a probabilistic model to optimally label the regions in the RAG using an appropriate set of semantic labels. This image analyzing step 207A will be described in more detail below. After step 207A, the process then outputs at step 208A a resultant labelled RAG. This RAG 208A represents a description of the content of the image, or metadata, that can be used for higher-level processes, such as content-based retrieval or similarity-based retrieval.

Such a set of appropriate semantic labels is generally selected for a particular task or application domain. An example of a typical application domain is "Outdoor Scenes". This application domain might comprise labels for regions such as "sky", "water", "foliage", "grass", etc. Another application domain might consist of labels useful for analyzing office scenes. Such an application domain might contain labels for desks, chairs, bookcases, etc.

Preferably, the contextual analyzing step 210A (see FIG. 2A) can use any available contextual information 201A to bias the prior probabilities of the labels in a predetermined application domain. This process of adjustment is indicated in block 212A resulting in the application domain having adjusted prior probabilities for its labels. The application domain 213A having adjusted prior probabilities is then used by the image analyzing step 207A. Alternatively, a keyword searching step 211A may search the contextual information 201A for keywords or phrases. On the basis of these keywords or phrases, the method can bias the prior probabilities of the labels.

Figure 2B:
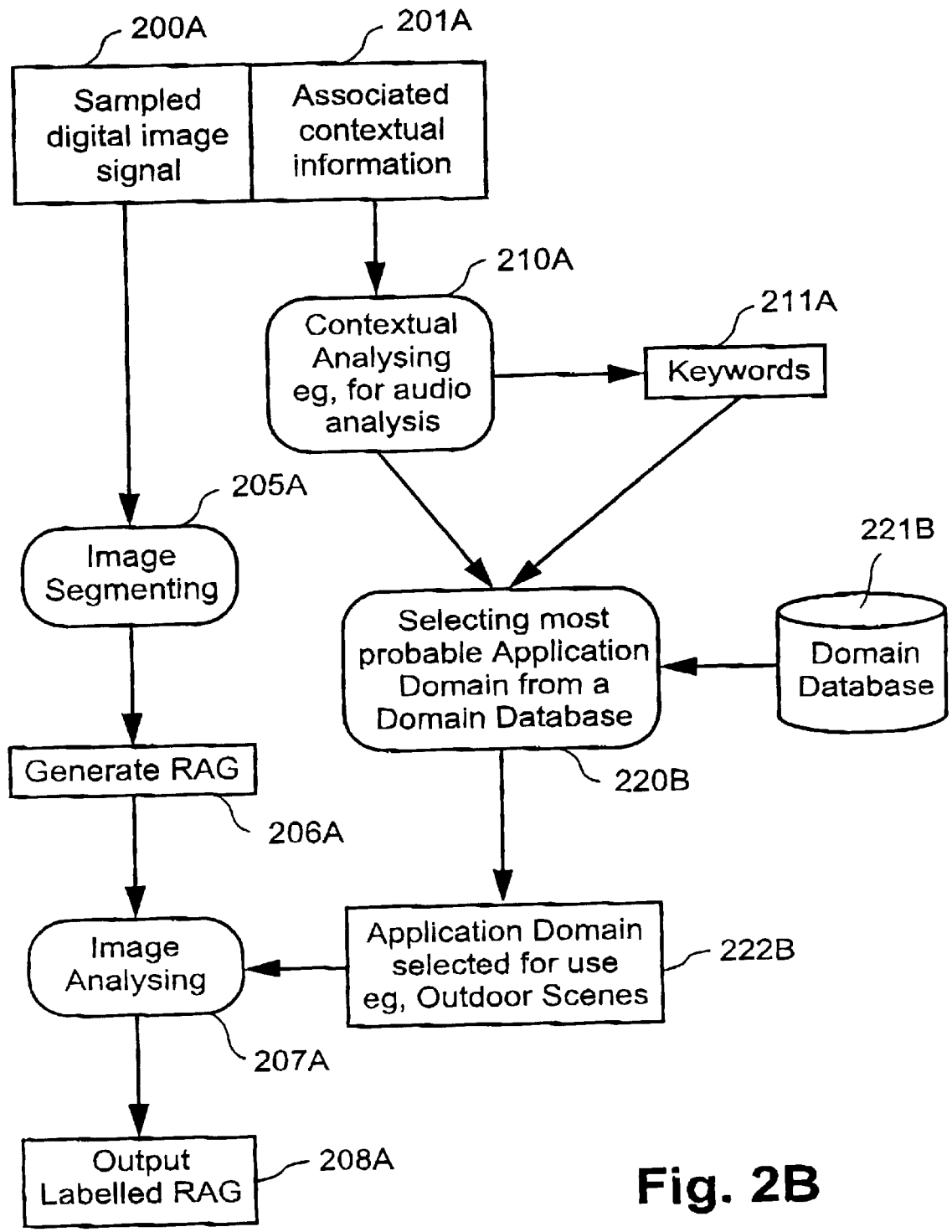
FIG. 2B is a block diagram illustrating the image interpreting step 106 according to a second embodiment.

Turning now to FIG. 2B, there is shown a block diagram of the image interpreting step 106 in accordance with a second embodiment. In this embodiment, the contextual information 201A is used by the contextual analyzing step 210A to assist in the selection 220B of the appropriate application domain from a selection of available application domains stored in an application domain database 221B. The contextual information 201A could also be used to adjust the probabilities of individual labels in the selected application domain. The application domain 222B having adjusted prior probabilities is then used by the image analyzing step 207A.

If the digital images being processed have their origin in a digital video signal then contextual information can be derived from a temporal region of interest about the image frame in the signal. For example, the contextual information could comprise motion information, labelled RAGs from surrounding image frames, etc.

Figure 5:
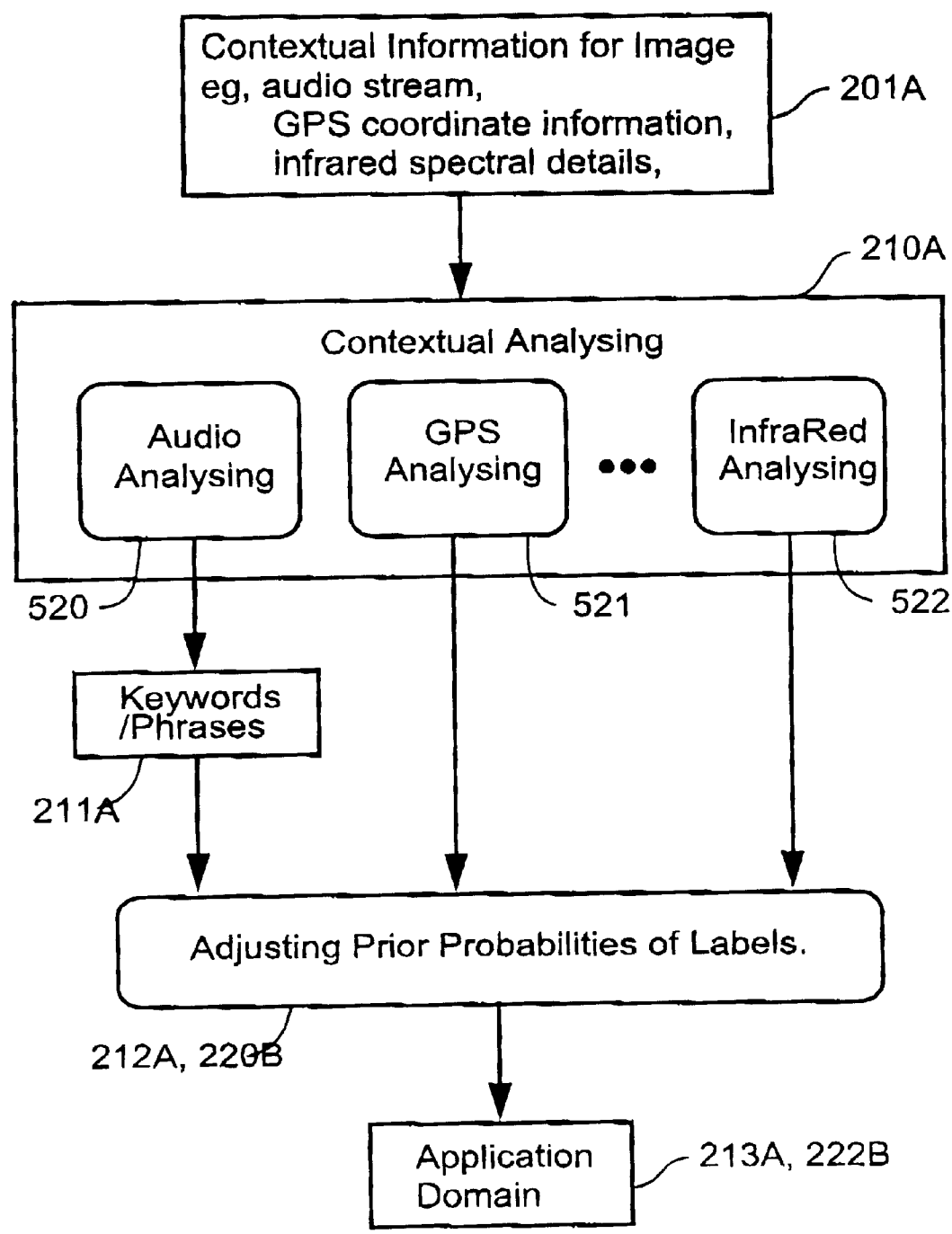
FIG. 5 is a block diagram illustrating the contextual analyzing step 110A of FIGS. 2A and 2B.

The contextual analyzing step 210A of FIGS. 2A and 2B is now described in more detail with reference to FIG. 5. The description is based on the analysis of a digital image, however it should be apparent to those skilled in the art that there are many further sources of contextual information 201A if the image signal being processed has been extracted from a digital video signal.

If there are multiple sources of contextual information 201A then the contextual analyzing step may consist of more than one contextual analyzing substeps. For example, if the camera could optionally record an audio stream, GPS coordinates and the positions of high infrared activity in the image, then the contextual analyzing step 210A might consist of an audio analyzing step, 520, a GPS analyzing step, 521, and an infrared analyzing step, 522. Textural annotations could also be analyzed as a source of context.

The role of the contextual analyzing step 210A in the first embodiment is to alter the prior probabilities of the labels in the selected application domain(See FIG. 2A). As mentioned hereinbefore as a second embodiment of the method, the contextual analyzing step 210A can also bias the selection of a particular application domain from an application domain database 221B (see FIG. 2B).

A keyword searching step, 211A may achieve this result by recognizing key words or phrases in the audio stream from the audio analyzing step 520 and then checking to see whether these key words/phrases suggest that any particular labels are more likely to occur in the image than other labels. In the simplest embodiment of the preferred method (i.e., an image interpretation process with a single application domain) the prior probabilities for labels could be adjusted on the basis of a list of key words/phrases being stored for each label in the application domain with a prior probability weighting factor for each key word/phrase (the higher the probability weighting factor the more likely that a region, described by that label, exists in the image). In an image interpretation process having multiple application domains (i.e., as depicted in FIG. 2B), each application domain could contain a similar list of key words/phrases and the role of the audio information may be to select which application domain should be used in the interpretation process.

Returning now to FIG. 1A, the labelled RAG for both images together with probability values indicative of whether the assigned labels are correct are output by the image interpretation process 106. After step 106, the method continues at step 108, where a distance metric representing the similarity of the two images that have been analyzed using the image interpretation process is computed. The distance metric is determined by examining the labels assigned to corresponding pixels in the two digital images and is described in more detail below. After step 108, the process continues at step 110. In step 110, a comparison is made between the distance metric and a predetermined threshold value. If the distance metric is below the predetermined threshold value, the method outputs data indicating that the two images are similar. Otherwise, if the distance metric is equal to or above the threshold, the method outputs data indicating that the two images are different. Preferably the threshold is set by performing a series of experiments using a particular application. The value of the threshold will depend very much on the application in which the computation is being used.

The distance metric (step 108) is computed as a measure of the similarity of the two digital images of interest. A small value for the distance metric implies that the two images are substantially similar. This distance metric, D, is calculated for a pair of images i and j by averaging over all the pixel coordinates, k, in the images using, $$D = \sum_{k} d[l(k_i), l(k_j)] w[e(k_i), e(k_j)]/n_k, \quad (1)$$

where $n_k$ represents the total number of pixels in the images, d[.] represents the distance between the labels applied to the pixel in each of image i, $l(k_i)$, and image j, $l(k_j)$, and w[.] is a weighting function which depends on the label energies of image i, $e(k_i)$, and image j, $e(k_j)$. Or in other words, d[.] represents the similarity between labels applied to the pixel k in the image and w[.] reflects the confidence with which the label has been assigned to the region containing the pixel coordinate k in images i and j.

The function d[.] may need to be computed between two different sets of labels. In this case a matrix of d values (between zero and one) d can be formulated which reflects similarities between various labels. For example, although the semantic labels "sky" and "cloud" are different labels they can be assigned to substantially similar regions of an image and hence the d value for this pair of images should be low. On the other hand, the d value for the label pair "sky" and "foliage" should be higher because regions assigned this label would typically be substantially different and should not be confused. If such a matrix d is not available then d[.] can be approximated by:

$$d[l(k_i), l(k_j)] = \begin{cases} 0 & l(k_i) = l(k_j) \\ 1 & l(k_i) \neq l(k_j) \end{cases} \quad (2)$$

The assigned labels which fiction d[.] is based on do not have to necessarily reflect the semantic content of the image. They can also reflect higher-level descriptions of the regions. For example, the image could be analyzed in terms of a set of color texture representations where each particular color texture representation has been assigned a label. The matrix d could then be numerically evaluated using an existing similarity metric and parametric models of the color texture.

The function w[.] can be based on the label energy at each of $k_i$ and $k_j$. These energies are available if the image analyzing step 207A uses MRF model for analysis as below. For example, if the calculated label energies were in the range [0,1.0] then w[.] could be taken as the maximum of the two label energies, $e(k_i)$ and $e(k_j)$:

$$w[e(k_i), e(k_j)] = \max(e(k_i), e(k_j)) \quad (3)$$

Other alternatives, such as taking the mean of the two energies values, could also be used. The values $e(k_i)$ and $e(k_j)$ could also derived from some other measure of the probability that the assigned label is correct. This will depend on the probabilistic model used to interpret the images. As will be apparent to those skilled in the art a high label energy is indicative of a low probability that the label has been correctly assigned (and vice versa). Thus weighting function w[.] in Eqn (3) can otherwise be expressed as being the minimum of the label probabilities of the two pixels $k_i$ and $k_j$. Alternatively, taking the mean of the label probability could also be used.

It will also be apparent to those skilled in the art, that it is possible to undertake the resolution conversion step during the distance metric computation step instead of before the image interpretation step. In the former case, the distance metric will only be calculated on the downsampled or averaged pixels of the higher resolution image.

Preferably, the image-analyzing step 207A uses a Markov Random Field (MRF) probabilistic model. The problem of image interpretation is considered as one of optimal labelling of the regions in the G.

If an application domain consists of a set of p labels, $L=\{L_1, L_2, L_3, \ldots, L_p\}$ with prior probabilities, $Pr_L=\{Pr_{L1}, Pr_{L2}, Pr_{L3}, \ldots, Pr_{Lp}\}$, which have been optionally biased by an analysis of the contextual information, then the interpretation process can be viewed as one of estimating the most probable set of labels on the graph G.

If the graph G consists of N disjoint regions, then let $X=\{X_1, X_2, X_3, \ldots, X_N\}$ be a family of random variables on the RAG. That is, X is a random field, where $X_i$ is the random variable associated with $R_i$. The realisation $x_i$ of $X_i$ is a member of the set of labels, L. A neighbourhood system $\Gamma$ on G is denoted by, $$\Gamma = \{n(R_i); 1 \leq i \leq N\}, \quad (4)$$

where $n(R_i)$ is a subset of R that contains neighbours of $R_i$. Preferably, a neighbourhood system for a region $R_i$ is that region and all other regions that have some common boundary with $R_i$.

Further, $\Omega$ is the set of all possible labelling configurations, $\omega$ denotes a configuration in $\Omega$, $$\Omega = \{\omega = \{x_1, x_2, x_3, \ldots, x_N\}: x_i \in L, 1 \leq i \leq N\} \quad (5)$$

Then X is a MRF with respect to the neighbourhood system $\Gamma$ if:

$P(X=\omega)>0$, for all realisations of X;

$$P(X_i=x_i|X_j=x_j, R_j \neq R_i) = P(X_i=x_i|X_j=x_j, R_j \in n(R_i)). \quad (6)$$

An important feature of the MRF is that its joint probability density function, $P(X=\omega)$, has a Gibbs distribution:

$$P(X=\omega)=Z^{-1} \exp[-U(\omega)/T]. \quad (7)$$

where T is the temperature, and $U(\omega)$ is the Gibbs energy function. The partition function Z is, $$Z = \sum_\omega \exp[-U(\omega)/T]. \quad (8)$$

The energy function can be expressed using the concept of "cliques". A clique c, associated with the graph G, is a subset of R such that it contains either a single region or several regions that are all neighbours of each other. The cliques for each region in the RAG depicted in FIG. 4B are listed in FIG. 6. The region R1 has associated cliques {R1}, {R1, R2}, and {R1, R3}, for example.

The set of cliques for the graph G is denoted C. A clique function $V_c$ is a function with the property that $V_c(\omega)$ depends on the $x_i$ values (i.e., labels) for which (i ∈c). Since a family of clique functions is called a potential, $U(\omega)$ can be obtained by summing the clique functions for G;

$$U(\omega) = \sum_{c \in C} V_c(\omega). \quad (9)$$

Region-based feature measurements obtained from the frame and prior knowledge are incorporated into the clique functions $V_c$. The likelihood of a particular region label $L_j$ given a set of region feature measurements can be estimated using various methods which could involve the use of a training set (e.g., neural networks) or may be based on empirical knowledge. Similarly, prior knowledge can be incorporated into the clique functions $V_c$ in the form of constraints that may or may not be measurement-based. For example, the constraints may be of the form that label $L_i$ and $L_j$ cannot be adjacent (i.e., have zero probability of being neighbours). Alternatively, if $L_i$ and $L_j$ are adjacent, the boundary is likely to have certain characteristics (e.g., fractal dimension), and the value of the constraint might depend on a measurement.

Equations 7 to 9 show that minimizing the Gibbs $U(\omega)$ energy for a configuration is equivalent to maximizing its probability density function. Preferably, the method seeks to find an optimum region label configuration given measurements obtained from the image M, prior knowledge about the labels K and the prior probabilities of the labels in the application domain Pr. The prior probabilities of the labels can optionally be biased by an analysis of contextual information. The problem of optimizing the labels over the entire RAG can be solved by iteratively optimizing the label at any site, i. The dependence of the label at region i on M, K and Pr is incorporated into the designed clique functions $V_c(\omega)$. Therefore the conditional probability density fiction for $X_i$ being $x_i$ at site i can be written as;

$$P(X_i = x_i \mid X, M, K, Pr) = Z_i^{-1} \exp\left[-\frac{1}{T}\sum_{c \in C_i} V_c(\omega)\right], \quad (10)$$

$$Z_i = \sum_{x \in L} \exp\left[-\frac{1}{T}\sum_{c \in C_i} V_c(\omega^x)\right],$$

where $C_i$ is the subset of C that consists of cliques that contain $X_i$ and $\omega^x$ denotes the configuration which is x at site i and agrees with ω everywhere else. The prior probabilities of the labels can also be used to bias the initial labels of the sites. For example, in a digital video signal labels of previously analyzed frames could be used to initialize a graph for a later analysis event.

As mentioned above, clique function can be based on feature measurements from the image M, prior knowledge about the labels K, and prior probabilities of the labels Pr. Consider, for example, the label "sky" in an Outdoor Scenes application domain. The set of cliques involving region (site) i on the RAG (i.e., $C_i$) would typically consist of a unary clique consisting of just region i and a set of cliques that involve groups of regions, each comprising region i, in which each region is a neighbour of each other region in the group.

The unary clique function could be calculated by measuring a collection of features for the region i and then using these feature measurements as input to a neural network that has been previously trained using examples of sky regions from manually segmented images. Examples of possible features which could be measured for a region comprise mean R, G and/or B values, mean luminance, variance of the luminance in the region, texture features which may involve measurements derived in the frequency domain, and region shape features such as compactness. The neural network would typically be trained to generate a low value (e.g., zero) for regions that have feature measurements that resemble those of the manually segmented sky regions and a high value (e.g., 1.0) for those regions that have feature measurements which are very dissimilar to those of the manually segmented regions.

Feature measurements can also be used in clique functions which involve more than one region. For example, a measure of the tortuosity of a common boundary between two regions could be used in a clique function involving a pair of regions. For example, the common boundary between a "sky" and a "water" region would typically not be very tortuous whereas the common boundary between "foliage" and "Sky" could well be very tortuous.

Prior knowledge can be incorporated into the clique functions in the form of constraints. For example, a clique function involving a "sky" label and a "grass" label might return a high-energy value (e.g., 1.0) if the region to which the "grass" label is being applied is above the region to which the "sky" label is being applied. In other words, we are using our prior knowledge of the fact that the "sky" regions are usually located above the "grass" regions in images.

The prior probability of region i being "sky", $Pr_{Sky}$, could also be incorporated into clique functions. One method of doing this would be to multiply an existing unary clique fiction by a factor such as;

$$\left(1 - \alpha\left(\frac{Pr_{Sky}}{\underset{L \in L}{\text{argmax}}Pr_L}\right)\right), \quad (11)$$

where α is some parameter in the range of [0,1] that weights the contribution of the prior probability to the overall clique function. Prior probabilities could also be incorporated into clique functions involving more than one region. In this case, the multiplying factor for the clique function would typically involve the prior probabilities of each of the labels in the clique function.

Equation 10 demonstrates that selecting the most probable label at a site is equivalent to minimizing the Gibbs energy function $U(\omega)$ at the site. The optimum region label configuration for the frame can be obtained by iteratively visiting each of the N sites on the graph G and updating the label at each site. There exist several methods by which the region labels are updated. A new label can be selected for a region from either a uniform distribution of the labels or from the conditional probability distribution of the MRF (i.e., the Gibbs Sampler, see Geman and Geman, *IEEE Trans. Pattern Analysis and Machine Intelligence*, 6, pp. 721–741, 1984). If more rapid convergence is desirable, then the iterated conditional modes (described by Besag, J., *J. R. Statistical Soc. B*, 48, pp. 259–302, 1986) method may be used. In the latter method, sites on the RAG are iteratively visited and, at each site, the label of the region is updated to be the label that has the largest conditional probability distribution. The iterative procedure of visiting updating sites can be implemented within a simulated annealing scheme, where the temperature is gradually decreased). The method of updating is not critical for this method.

In a further embodiment of the method the image segmentation process and region labelling process can be combined together, and preferably a single minimization process applied.

A method for adjusting the prior probabilities of labels in an application domain is described below. The adjustment of these probabilities is performed by the contextual analyzing step 210A of FIGS. 2A and 2b in the event that some contextual information is available. The adjusted prior probabilities are used by the image-analyzing step, 207A, of FIG. 2A and 23.

Each label can be associated with one or more evidence units, where an evidence unit comprises a key word or phrase and a weight factor between 0 and 1. For example, an evidence unit for the label "water" might consist of the key word "beach" and a weighting factor of 0.8. The value of the weighting factor implies the likelihood that the existence of the key word in any associated audio contextual information indicates that "Water" is the appropriate label for at least one region in the RAG. The associated audio contextual information could have been obtained from either an audio stream recorded with a digital image, or in the case of an image frame from a digital video signal being analyzed, any audio information that may exist in a temporal region of interest in the digital video signal.

Before evidence is collected the sum of the prior probabilities of all labels should sun to 1.0. In other words:

$$\sum_{l=1}^{L} Pr_l = 1.0. \quad (12)$$

As evidence is collected from the contextual information, evidence units are instantiated. The weight factors for the different instantiated evidence units for a given label l, can be summed to generate the total evidence for the label, $E_l$.

The $Pr_l$ values for the labels in the application domain 440 can then be calculated using, $$Pr_l = (1+E_l)x, \quad (13)$$

where the value of x is obtained by solving:

$$\sum_{l=1}^{L} (1+E_l)x = 1.0. \quad (14)$$

Preferred Embodiment of Apparatus(s)

Figure 7:
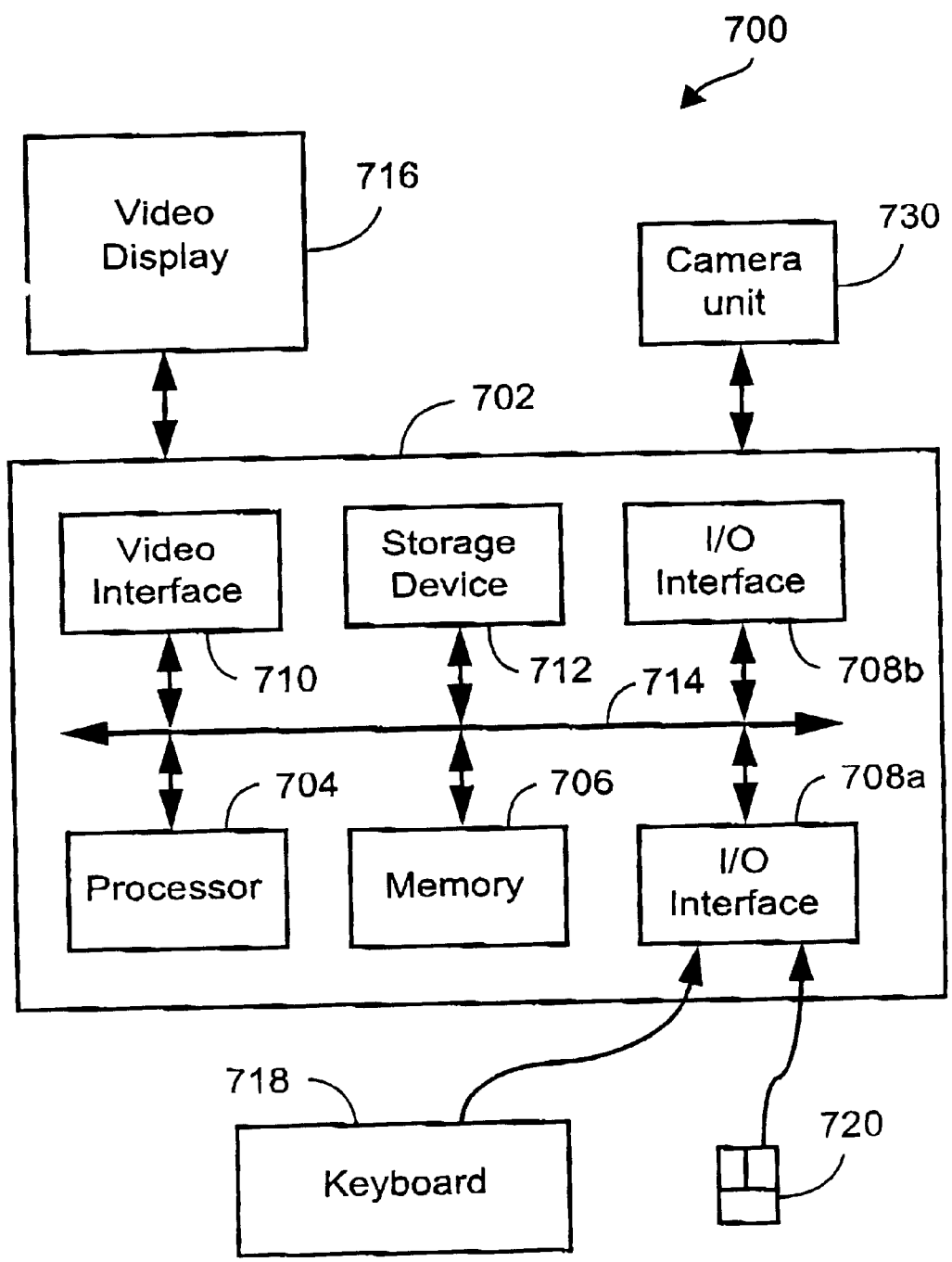
FIG. 7 is a block diagram of a general-purpose computer with which the embodiments of the invention may be practiced.

The method of computing the similarity between two digital images is preferably practiced using a conventional general-purpose computer, such as the one shown in FIG. 7 wherein the processes of FIGS. 1, 2A, and 5 or FIGS. 1, 2B, and 5 may be implemented as a computer program executing on the computer. In particular, the steps of method of FIG. 1 are effected by code in the program that are carried out by the computer. The program may be divided into two separate parts; one part for carrying out the computational steps; and another part to manage the user interface between the latter and the user. The computer program may be stored in a computer readable medium, comprising the storage devices described below, for example. The computer program is loaded into the computer from the computer readable medium, and then executed by the computer.

The computer system 700 consists of the computer 702, a video display 716, and input devices 718, 720. In addition, the computer system 700 can have any of a number of other output devices comprising line printers, laser printers, plotters, and other reproduction devices connected to the computer 702. The computer system 700 can be connected to one or more other computers via a communication interface using an appropriate communication channel such as a modem communications path, a computer network, or the like. The computer network may comprise a local area network (LAN), a wide area network (WAN), an Intrnet, and/or the Internet The computer 702 itself consists of a central processing unit(s) (simply referred to as a processor hereinafter) 704, a memory 706 which may comprise random access memory (RAM) and read-only memory (ROM), input/output (IO) interfaces 708a and 708b, a video interface 710, and one or more storage devices generally represented by a block 712 in FIG. 7. The storage device(s) 712 can consist of one or more of the following: a floppy disc, a hard disc drive, a magneto-optical disc drive, CD-ROM, magnetic tape or any other of a number of non-volatile storage devices well known to those skilled in the art. Each of the components 704 to 712 is typically connected to one or more of the other devices via a bus 714 that in turn can consist of data, address, and control buses.

The video interface 710 is connected to the video display 716 and provides video signals from the computer 702 for display on the video display 716. User input to operate the computer 702 can be provided by one or more input devices 708b. For example, an operator can use the keyboard 718 and/or a pointing device such as the mouse 720 to provide input to the computer 702.

A camera unit 730 is also coupled to the computer 700 via input/output interface 708b. The camera unit is capable of recording a digital image or video signal into storage (e.g. memory) and any additional contextual information that is associated with the signal (e.g. camera parameters). Both the signal data and any additional contextual information are downloaded to the computer where the interpretation and labelling is performed in accordance with the embodiments hereinbefore described.

The system 700 is simply provided for illustrative purposes and other configurations can be employed without departing from the scope and spirit of the invention. Exemplary computers on which the embodiment can be practiced comprise IBM-PC/ATs or compatibles, one of the Macintosh (™) family of PCs, Sun Sparcstation (™), or the like. The foregoing are merely exemplary of the types of computers with which the embodiments of the invention may be practiced. Typically, the processes of the embodiments, described hereinbefore, are resident as software or a program recorded on a hard disk drive (generally depicted as block 712 in FIG. 7) as the computer readable medium, and read and controlled using the processor 704. Intermediate storage of the program and pixel data and any data fetched from the network may be accomplished using the semiconductor memory 706, possibly in concert with the hard disk drive 712.

In some instances, the program may be supplied to the user encoded on a CD-ROM or a floppy disk (both generally depicted by block 712), or alternatively could be read by the user from the network via a modern device connected to the computer, for example. Still further, the software can also be loaded into the computer system 700 from other computer readable medium comprising magnetic tape, a ROM or integrated circuit, a magneto-optical disk, a radio or infra-red transmission channel between the computer and another device, a computer readable card such as a PCMCIA card, and the Internet and Intranets comprising email transmissions and information recorded on websites and the like. The foregoing are merely exemplary of relevant computer readable mediums. Other computer readable mediums may be practiced without departing from the scope and spirit of the invention.

The method of computing the similarity between two digital images may alternatively be implemented in dedicated hardware such as one or more integrated circuits performing the functions or sub functions of the method. Such dedicated hardware may comprise graphic processors, digital signal processors, or one or more microprocessors and associated memories.

The foregoing only describes a small number of embodiments of the present invention, however, modifications and/or changes can be made thereto by a person skilled in the art without departing from the scope and spirit of the invention. The present embodiments are, therefore, to be considered in all respects to be illustrative and not restrictive.

We claim:

1. A method of computing the similarity between two images, wherein said images each comprise a plurality of pixels and said method comprises the steps of:
    segmenting each of the images into homogeneous regions;
    assigning to at least one of the generated regions a semantic label which describes the content of the region; and
    computing a distance metric from predetermined semantic differences between the assigned semantic labels at corresponding pixels in the two images, wherein said distance metric is representative of the similarity of the two images.

2. A method as claimed in claim 1, wherein said method further comprises, prior to said segmenting step, the step of:
    determining whether both images have the same dimensions in pixels and if not converting one of the said images to have the same pixel dimensions as the other image.

3. A method as claimed in claim 2, wherein said determining and converting step occurs after said assigning step.

4. A method as claimed in claim 2, wherein said determining and converting steps occurs during said computing step.

5. A method as claimed in claim 1, wherein the predetermined semantic difference between two labels for a corresponding pixel is 1 if the labels are different and 0 if the labels are the same.

6. A method as claimed in claim 1, wherein the predetermined semantic difference between two labels is a value between 0 and 1, wherein a greater value is indicative of labels that are semantically substantially different.

7. A method as claimed in claim 1, wherein said assigning step comprises assigning the semantic labels to the homogeneous regions using a probabilistic method which results in each assigned label for a region having an associated probability or likelihood of the label being correctly assigned.

8. A method as claimed in claim 7, wherein the homogeneous regions generated in said segmenting step are represented by a region adjacency graph.

9. A method as claimed in claim 8, wherein the probabilistic method used to assign the labels to particular regions is based on a Markov Random Field modeled on the region adjacency graph.

10. A method as claimed in claim 7, wherein the associated probabilities of labels being correctly assigned are represented as energies, wherein a small energy value is indicative that a label has been assigned with a high probability.

11. A method as claimed in claim 1, wherein said method further comprises the steps of:
    comparing the distance metric with a predetermined threshold, and if the distance metric is below said predetermined threshold,
    outputting data indicating said images are similar.

12. A method as claimed in claim 11, wherein if the distance metric is equal to or above said predetermined threshold said method further comprises the step of:
    outputting data indicating said images are not similar.

13. A method as claimed in claim 1, wherein the images are frames from a digital video signal.

14. A method as claimed in claim 1, wherein if the two images have different dimensions in pixels, then the image having the larger dimensions is scaled down to the smaller dimensions for the computation of the distance metric.

15. A method as claimed in claim 1, wherein said distance metric is computed by averaging over all corresponding pixels in the two images the product of said predetermined semantic difference and a weighting function which depends on the probability of the labels being correctly assigned for each of the corresponding pixels.

16. A method as claimed in claim 15, wherein the weighting function is the minimum value of the probabilities associated with the labels of the two corresponding pixels.

17. A method as claimed in claim 15, wherein the weighting function is the mean of the label probabilities of the two corresponding pixels.

18. A method as claimed in claim 15, wherein the distance metric D is computed for the two images i and j by averaging over all the pixel coordinates, k, in the images using, $$D = \sum_k d[l(k_i), l(k_j)] w[e(k_i), e(k_j)] / n_k,$$

where $n_k$ represents the total number of pixels in the images, d[.] represents the distance between the labels applied to the pixel in each of image i, $l(k_i)$, and image j, $l(k_j)$, and w[.] is said weighting function which depends on the label energies of image i, $e(k_i)$, and image j, $e(k_j)$.

19. A method of computing the similarity between two images, wherein said images each comprise a plurality of pixels and said method comprises the steps of:
    segmenting each of the images into homogeneous regions;
    assigning semantic labels to the homogeneous regions to describe the content of the regions using a probabilistic method which results in each assigned label for a region having an associated probability or likelihood of the label being correctly assigned;

computing a distance metric which averages over all corresponding pixels in the two images a value which is the product of a predetermined semantic difference between the assigned labels at the corresponding pixels and a weighting function which is derived from the associated probability of the labels for each of the corresponding pixels; and comparing the distance metric with a predetermined threshold in order to determine the similarity of the images.

20. An apparatus for computing the similarity between two images, wherein said images each comprise a plurality of pixels and said apparatus comprises:

means for segmenting each of the images into homogeneous regions;

means for assigning to at least one of the generated regions a semantic label which describes the content of the region; and means for computing a distance metric from predetermined semantic differences between the assigned semantic labels at corresponding pixels in the two images, wherein said distance metric is representative of the similarity of the two images.

21. An apparatus as claimed in claim 20, wherein said apparatus further comprises:

means for determining whether both images have the same dimensions in pixels, and if not, converting one of the images to have the same pixel dimensions as the other image.

22. An apparatus as claimed in claim 20, wherein the predetermined semantic difference between two labels for a corresponding pixel is 1 if the labels are different and 0 if the labels are the same.

23. An apparatus as claimed in claim 20, wherein the predetermined semantic difference between two labels is a value between 0 and 1, wherein a greater value is indicative of labels that are semantically substantially different.

24. An apparatus as claimed in claim 20, wherein said assigning means comprises means for assigning the semantic labels to the homogeneous regions using a probabilistic method which results in each assigned label for a region having an associated probability or likelihood of the label being correctly assigned.

25. An apparatus as claimed in claim 24, wherein the homogeneous regions generated by the segmenting means are represented by a region adjacency graph.

26. An apparatus as claimed in claim 25, wherein the probabilistic method used to assign the labels to particular regions is based on a Markov Random Field modelled on the region adjacency graph.

27. An apparatus as claimed in claim 24, wherein the associated probabilities of labels being correctly assigned are represented as energies, wherein a small energy value is indicative that a label has been assigned with a high probability.

28. An apparatus as claimed in claim 20, wherein said apparatus further comprises:

means for comparing the distance metric with a predetermined threshold; and means for outputting data indicating whether said images are similar.

29. An apparatus as claimed in claim 20, wherein the images are frames from a digital video signal.

30. An apparatus as claimed in claim 20, wherein if the two images have different dimensions in pixels, then the image having the larger dimensions is scaled down to the smaller dimensions for the computation of the distance metric.

31. An apparatus as claimed in claim 20, wherein said distance metric is computed by averaging over all corresponding pixels in the two images the product of said predetermined semantic difference and a weighting function which depends on the probability of the labels being correctly assigned for each of the corresponding pixels.

32. An apparatus as claimed in claim 31, wherein the weighting function is the minimum value of the probabilities associated with the labels of the two corresponding pixels.

33. An apparatus as claimed in claim 31, wherein the weighting function is the mean of the label probabilities of the two corresponding pixels.

34. An apparatus as claimed in claim 31, wherein the distance metric D is computed for the two images i and j by averaging over all the pixel coordinates, k, in the images using, $$D = \sum_k d[l(k_i), l(k_j)] w[e(k_i), e(k_j)] / n_k,$$

where $n_k$ represents the total number of pixels in the images, $d[.]$ represents the distance between the labels applied to the pixel in each of image i, $l(k_i)$, and image j, $l(k_j)$, and $w[.]$ is said weighting function which depends on the label energies of image i, $e(k_i)$, and image j, $e(k_j)$.

35. An apparatus for computing the similarity between two images, wherein said images each comprise a plurality of pixels and said apparatus comprises:

means for segmenting each of the images into homogeneous regions;

means for assigning semantic labels to the homogeneous regions to describe the content of the regions using a probabilistic method which results in each assigned label for a region having an associated probability or likelihood of the label being correctly assigned;

means for computing a distance metric which averages over all corresponding pixels in the two images a value which is the product of a predetermined semantic difference between the assigned labels at the corresponding pixels and a weighting function which is derived from the associated probability of the labels for each of the corresponding pixels; and means for comparing the distance metric with a predetermined threshold in order to determine the similarity of the images.

36. A computer readable medium comprising a computer program for computing the similarity between two images, wherein said images each comprise a plurality of pixels, said computer program comprises:

code for segmenting each of the images into homogeneous regions;

code for assigning to at least one of the generated regions a semantic label which describes the content of the region; and code for computing a distance metric from predetermined semantic differences between the assigned semantic labels at corresponding pixels in the two images, wherein said distance metric is representative of the similarity of the two images.

37. A computer readable medium comprising a computer program for computing the similarity between two images, wherein said images each comprise a plurality of pixels, said computer program comprises:

code for segmenting each of the images into homogeneous regions;

code for assigning semantic labels to the homogeneous regions to describe the content of the regions using a probabilistic method which results in each assigned label for a region having an associated probability or likelihood of the label being correctly assigned;

code for computing a distance metric which averages over all corresponding pixels in the two images a value which is the product of a predetermined semantic difference between the assigned labels at the corresponding pixels and a weighting function which is derived from the associated probability of the labels for each of the corresponding pixels; and code for comparing the distance metric with a predetermined threshold in order to determine the similarity of the images.

* * * * *

UNITED STATES PATENT AND TRADEMARK OFFICE
CERTIFICATE OF CORRECTION

PATENT NO. : 6,718,063 B1
DATED : April 6, 2004
INVENTOR(S) : Lennon et al.

It is certified that error appears in the above-identified patent and that said Letters Patent is hereby corrected as shown below:

Title page,
Item [57], ABSTRACT,
Line 3, ""foliage" etc)" should read -- "foliage", etc.) --.

Drawings,
Sheet 2, Fig. 2A, in the boxes labeled "210A" and "213A", "eg," should read -- e.g., --;
Sheet 3, Fig. 2B, in the boxes labeled "210A" and "222B", "eg," should read -- e.g., --; and
Sheet 6, Fig. 5, in the box labeled "201A", "eg," should read -- e.g., --, and in the box labeled "522", "InfraRed" should read -- Infrared --.

Column 2,
Line 29, "have" should read -- has --;
Lines 40 and 56, "comprise" should read -- comprises --.

Column 3,
Lines 6, 20, 39 and 56, "comprise" should read -- comprises --

Column 4,
Line 46, "consists" should read -- consist --.

Column 5,
Line 42, "region R2," should read -- regions R2, --.

Column 6,
Line 48, "domain(See" should read -- domain (See --.

Column 7,
Line 34, "$k\bullet$ under the "$\Sigma$" should read -- $k$ --; and
Line 63, "fiction d[.]" should read -- function d[.] --.

Column 8,
Line 16, "energies" should read -- energies' --; and
Line 17, "also derived" should read -- also be derived --.

Column 9,
Line 42, "secks" should read -- seeks --; and
Line 54, ""as;" should read -- as: --.

UNITED STATES PATENT AND TRADEMARK OFFICE
CERTIFICATE OF CORRECTION

PATENT NO. : 6,718,063 B1
DATED : April 6, 2004
INVENTOR(S) : Lennon et al.

It is certified that error appears in the above-identified patent and that said Letters Patent is hereby corrected as shown below:

Column 10,
Line 36, ""Sky"" should read -- "sky" --;
Line 49, "as;" should read -- as: --; and
Line 66, "at,the" should read -- at the --.

Column 11,
Line 16, "decreased)." should read -- decreased. --;
Line 25, "FIGS. 2A and 2b" should read -- FIGS. 2A and 2B --;
Line 28, "FIGS. 2A and 23" should read -- FIGS. 2A and 2B --;
Line 36, ""Water"" should read -- "water" --;
Line 44, "sun" should read -- sum --; and
Line 64, "Apparatus(s)" should read -- Apparatus(es) --.

Column 12,
Line 24, "Intrnet," should read -- intranet, --;
Lines 49 and 51, "(eg." should read -- (e.g., --.

Column 13,
Line 9, "modern" should read -- modem --;
Line 38, "comprise" should read -- comprises --;
Line 54, "and" should read -- and, --, and "not" should read -- not, --; and
Line 60, "steps" should read -- step --.

Column 14,
Line 24, the right margin should be closed up; and
Line 61, "comprise" should read -- comprises --.

Column 15,
Line 15, "comprise" should read -- comprises --;
Line 30, "pixels, and" should read -- pixels and, --.

UNITED STATES PATENT AND TRADEMARK OFFICE
CERTIFICATE OF CORRECTION

PATENT NO. : 6,718,063 B1
DATED : April 6, 2004
INVENTOR(S) : Lennon et al.

It is certified that error appears in the above-identified patent and that said Letters Patent is hereby corrected as shown below:

Column 16,
Lines 33 and 55, "comprise" should read -- comprises --.

Column 17,
Line 17, "comprise" should read -- comprises --.

Signed and Sealed this

Tenth Day of May, 2005

JON W. DUDAS
*Director of the United States Patent and Trademark Office*